US009956891B2

(12) United States Patent
Fukudome (10) Patent No.: US 9,956,891 B2
(45) Date of Patent: May 1, 2018

(54) ELECTRIC VEHICLE

(71) Applicant: TOYOTA JIDOSHA KABUSHIKI KAISHA, Toyota-shi, Aichi-ken (JP)

(72) Inventor: Hideki Fukudome, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days. days.

(21) Appl. No.: 15/222,470

(22) Filed: Jul. 28, 2016

(65) Prior Publication Data

US 2017/0028872 A1    Feb. 2, 2017

(30) Foreign Application Priority Data

Jul. 30, 2015    (JP) .................. 2015-151272

(51) Int. Cl.
*B60L 15/20*    (2006.01)
*B60K 7/00*    (2006.01)

(52) U.S. Cl.
CPC ........ *B60L 15/2036* (2013.01); *B60K 7/0007* (2013.01); *B60K 2007/0038* (2013.01); *B60L 2220/44* (2013.01); *B60L 2220/46* (2013.01); *B60L 2240/12* (2013.01); *B60L 2240/16* (2013.01); *B60L 2240/22* (2013.01); *B60L 2240/24* (2013.01); *B60L 2240/46* (2013.01); *B60L 2260/44* (2013.01); *Y02T 10/645* (2013.01); *Y02T 10/648* (2013.01); *Y02T 10/7275* (2013.01)

(58) Field of Classification Search
CPC ............. B60L 15/2036; B60L 2220/44; B60L 2220/46; B60L 2240/12; B60L 2240/16; B60L 2240/22; B60L 2240/24; B60L 2240/46; B60L 2260/44; B60K 1/00; Y02T 10/7258
See application file for complete search history.

(56) References Cited

U.S. PATENT DOCUMENTS 4,811,969 A * 3/1989 Sugiyama .............. B60G 7/006
180/412
2013/0151104 A1   6/2013 Fujii et al.
2014/0145498 A1 * 5/2014 Yamakado ............ B60T 8/1755
303/3

FOREIGN PATENT DOCUMENTS

JP        61-202908 A     9/1986
JP     2009214742 A *     9/2009
(Continued)

*Primary Examiner* — Aaron L Troost
(74) *Attorney, Agent, or Firm* — Sughrue Mion, PLLC (57) ABSTRACT

Provided is an electric vehicle, including: left and right rear wheels, which are suspended from a vehicle body by suspensions that elastically allow displacements in a longitudinal direction of the vehicle with respect to the vehicle body, the rear wheels being capable of being driven by corresponding motors independently of each other; and a control device configured to control driving forces of the rear wheels. Target driving forces Ti for the left and right rear wheels are calculated during traveling, a value ΔG relevant to a difference between relative displacement amounts of the rear wheels in a longitudinal direction of the vehicle with respect to the vehicle body is calculated, and the target driving forces are corrected based on the value relevant to the difference between the relative displacement amounts so that a magnitude of the value relevant to the difference between the relative displacement amounts becomes smaller.

5 Claims, 7 Drawing Sheets

(56) References Cited

FOREIGN PATENT DOCUMENTS

JP    2015-023753 A    2/2015
WO    5348328 A1    11/2013

* cited by examiner

ELECTRIC VEHICLE

BACKGROUND

1. Technical Field

The present disclosure relates to an electric vehicle having left and right rear wheels to be driven by corresponding motors, respectively.

2. Description of the Related Art

There is widely known an electric vehicle having wheels to be driven by corresponding motors, respectively, as one of electric vehicles such as electric automobiles. In this type of electric vehicle, during normal travel of an electric vehicle, a target driving torque is calculated for each motor based on a driving operation amount of a driver, and an output of each motor is feed-back controlled so that an actual driving torque of each motor attains a corresponding target driving torque.

In the above-mentioned type of electric vehicle, braking/driving forces of respective drive wheels can be controlled independently of one another. Thus, the braking/driving forces of drive wheels are controlled independently of a braking/driving operation of the driver as necessary depending on a travel state of the electric vehicle. For example, in Japanese Patent Application Laid-open No. 2015-23753, there is disclosed an electric vehicle configured to calculate a braking/driving force distribution ratio for wheels so that a steering characteristic for the vehicle at the time of turning attains a neutral steering characteristic, and to control a braking/driving force of each wheel based on the braking/driving force distribution ratio.

As widely known in the art, at the time of transitional turning when a vehicle transitions from a traveling straight ahead state to a turning state or from a turning state to a traveling straight ahead state, front wheels, which are steered wheels, are steered and a turning lateral force is generated by the front wheels, to thereby turn around a vehicle body. However, rear wheels try to maintain their earlier movement states, and thus the rear wheels are in a yaw motion with respect to the vehicle body in accordance with a compliance caused by elastic deformation of a rubber bush or the like of a rear wheel suspension. As a result, the rear wheels are in a state of temporarily being steered in a direction opposite to that of the front wheels. After that, the rear wheels are displaced in a yaw direction with respect to the vehicle body so that a longitudinal direction of the rear wheels is returned to a normal position that is directed along a longitudinal direction of the vehicle due to a restoring moment caused by a force generated by elastic deformation of the rubber bush or the like.

The phenomenon described above becomes more conspicuous as a vehicle speed, a change speed of a steering angle of the front wheels, or the compliance of the rear wheel suspension increases. Further, the phenomenon described above becomes more conspicuous in a case of a vehicle in which a suspension member is elastically coupled to the vehicle body and an inner end of a suspension arm is elastically coupled to the suspension member compared to a case of a vehicle in which the inner end of the suspension arm is elastically coupled to the vehicle body. Further, the phenomenon described above is not limited to the time when the vehicle is turning, but also arises, for example, under a situation in which the vehicle receives a cross wind after passing through a tunnel, and the vehicle body is inclined. When the phenomenon described above arises conspicuously, degradation in steering stability due to a change in turning angle of the rear wheels, which is caused along with turning of the vehicle body, cannot be avoided.

In the electric vehicle disclosed in Japanese Patent Application Laid-open No. 2015-23753, the braking/driving force distribution ratio for wheels is calculated as a distribution ratio necessary for causing the steering characteristic of the vehicle at the time of turning to attain the neutral characteristic. Thus, also in the electric vehicle disclosed in Japanese Patent Application Laid-open No. 2015-23753, degradation in steering stability due to a change in turning angle of the rear wheels, which is caused along with turning of the vehicle body due to the phenomenon described above, cannot be avoided.

SUMMARY

The present disclosure provides an electric vehicle having left and right rear wheels to be driven by corresponding motors, respectively, capable of controlling driving forces for the left and right rear wheels so that degradation in steering stability due to a change in turning angle of the rear wheels, which is caused along with turning of a vehicle body, is reduced.

According to one embodiment of the present disclosure, there is provided an electric vehicle, including: left and right rear wheels, which are suspended from a vehicle body by suspensions that elastically allow the left and right rear wheels to be displaced in a longitudinal direction of the electric vehicle with respect to the vehicle body, the left and right rear wheels being capable of being driven by corresponding motors independently of each other; and a control device configured to calculate target driving forces for the left and right rear wheels and to control driving forces of the left and right rear wheels based on the target driving forces.

The electric vehicle also includes an acquisition device configured to acquire, when the electric vehicle is traveling, a value relevant to a difference between relative displacement amounts of the left and right rear wheels in the longitudinal direction of the electric vehicle with respect to the vehicle body, and the control device is configured to correct the target driving forces for the left and right rear wheels based on the value relevant to the difference between the relative displacement amounts so that a magnitude of the value relevant to the difference between the relative displacement amounts becomes smaller.

With the configuration described above, the target driving forces for the left and right rear wheels are corrected based on the value relevant to the difference between the relative displacement amounts so that the magnitude of the value relevant to the difference between the relative displacement amounts becomes smaller. Thus, under a situation in which the vehicle body turns around and the rear wheels are subsequently in a yaw motion in the turning around direction, the driving forces for the left and right rear wheels are controlled so that one rear wheel on a traveling backward direction side of the vehicle with respect to the vehicle body moves toward a traveling forward direction side of the vehicle with respect to the vehicle body, whereas the other rear wheel on the traveling forward direction side of the vehicle with respect to the vehicle body moves toward the traveling backward direction side of the vehicle with respect to the vehicle body. Thus, as compared to a case in which the target driving forces for the left and right rear wheels are not corrected, the difference between the relative displacement amounts of the left and right rear wheels in the longitudinal direction of the vehicle with respect to the vehicle body is reduced, and thus it is possible to reduce the change in turning angle of the rear wheels, which is caused along with turning of the vehicle body, and its resultant degradation in steering stability. Further, the compliance of the rear wheel suspension does not need to be decreased, and thus it is possible to reduce degradation in steering stability due to the change in turning angle of the rear wheels while ensuring a satisfactory ride quality of the vehicle.

Aspects of the Present Disclosure

In one aspect of the present disclosure, the acquisition device includes: a device configured to detect longitudinal accelerations of the vehicle body at positions that are spaced apart in a lateral direction of the electric vehicle in correspondence to the left and right rear wheels; and a device configured to detect longitudinal accelerations of the left and right rear wheels, and the control device is configured to calculate, as the value relevant to the difference between the relative displacement amounts, a difference between a left-side longitudinal acceleration difference and a right-side longitudinal acceleration difference based on the left-side longitudinal acceleration difference, which is a difference between the longitudinal acceleration of the vehicle body corresponding to the left rear wheel and the longitudinal acceleration of the left rear wheel, and on the right-side longitudinal acceleration difference, which is a difference between the longitudinal acceleration of the vehicle body corresponding to the right rear wheel and the longitudinal acceleration of the right rear wheel.

With the aspect described above, a difference between the left-side longitudinal acceleration difference, which is taken between the vehicle body and the left rear wheel, and the right-side longitudinal acceleration difference, which is taken between the vehicle body and the right rear wheel, that is, a left-right difference between the longitudinal acceleration differences is calculated as the value relevant to the difference between the relative displacement amounts. The left-right difference between the longitudinal acceleration differences is a change acceleration of the difference between the relative displacement amounts of the left and right wheels in the longitudinal direction of the vehicle, and the change acceleration of the difference between the relative displacement amounts leads the difference between the relative displacement amounts and the change velocity of the difference between the relative displacement amounts in terms of phase. Thus, with this aspect, as compared to a case in which a difference between the relative displacement amounts or a change velocity of the difference between the relative displacement amounts is acquired, it is possible to reduce a concern of delay of reducing the change in turning angle of the rear wheels, to thereby be able to effectively reduce degradation in steering stability due to the change in turning angle of the rear wheels.

In another aspect of the present disclosure, the acquisition device includes: a device configured to detect longitudinal velocities of the vehicle body at positions that are spaced apart in a lateral direction of the electric vehicle in correspondence to the left and right rear wheels; and a device configured to detect longitudinal velocities of the left and right rear wheels, and the control device is configured to calculate, as the value relevant to the difference between the relative displacement amounts, a difference between a left-side longitudinal velocity difference and a right-side longitudinal velocity difference based on the left-side longitudinal velocity difference, which is a difference between the longitudinal velocity of the vehicle body corresponding to the left rear wheel and the longitudinal velocity of the left rear wheel, and the right-side longitudinal velocity difference, which is a difference between the longitudinal velocity of the vehicle body corresponding to the right rear wheel and the longitudinal velocity of the right rear wheel.

With the aspect described above, a difference between the left-side longitudinal velocity difference, which is taken between the vehicle body and the left rear wheel, and the right-side longitudinal velocity difference, which is taken between the vehicle body and the right rear wheel, that is, a left-right difference between the longitudinal velocity differences is calculated as the value relevant to the difference between the relative displacement amounts. The left-right difference between the longitudinal velocity differences is a change velocity of the difference between the relative displacement amounts of the left and right wheels in the longitudinal direction of the vehicle, and the change velocity of the difference between the relative displacement amounts leads the difference between the relative displacement amounts in terms of phase. Thus, with this aspect, as compared to a case in which a difference between the relative displacement amounts is acquired, it is possible to reduce a concern of delay of reducing the change in turning angle of the rear wheels, to thereby be able to effectively reduce degradation in steering stability due to the change in turning angle of the rear wheels.

Further, in another aspect of the present disclosure, the suspensions include: a suspension member, which is connected to the vehicle body via an elastic member; and left and right suspension arms configured to couple the left and right rear wheels to the suspension member, the acquisition device includes a device configured to detect a yaw rate of the suspension member with respect to the vehicle body, and the control device is configured to determine the yaw rate of the suspension member with respect to the vehicle body as the value relevant to the difference between the relative displacement amounts.

With the aspect described above, the yaw rate of the suspension member with respect to the vehicle body is detected, and the yaw rate of the suspension member with respect to the vehicle body is determined as the value relevant to the difference between the relative displacement amounts. The yaw rate of the suspension member with respect to the vehicle body is a value corresponding to a change velocity of the difference between the relative displacement amounts of the left and right rear wheels in the longitudinal direction of the vehicle, and thus leads the difference between the relative displacement amounts in terms of phase. Thus, with this aspect, as compared to a case in which the difference between the relative displacement amounts is acquired, it is possible to reduce a concern of delay of reducing the change in turning angle of the rear wheels, to thereby be able to effectively reduce degradation in steering stability due to the change in turning angle of the rear wheels.

Further, in another aspect of the present disclosure, the suspensions include: a suspension member, which is connected to the vehicle body via an elastic member; and left and right suspension arms configured to couple the left and right rear wheels to the suspension member.

When the suspensions include the suspension member coupled to the vehicle body via an elastic member, under the situation in which the vehicle body turns around and the rear wheels are subsequently in a yaw motion in the turning around direction, the suspension member is also in a yaw motion in the turning around direction subsequently to the vehicle body. Thus, as compared to a case in which the suspensions do not include a suspension member, the turning angle of the rear wheels is likely to be changed along with turning of the vehicle body.

However, with the aspect described above, the target driving forces for the left and right wheels are corrected so that the magnitude of the value relevant to the difference between the relative displacement amounts of the left and right rear wheels in the longitudinal direction of the vehicle with respect to the vehicle body becomes smaller. Thus, it is also possible to reduce the amount of the yaw motion of the suspension member with respect to the vehicle body. Therefore, it is possible to reduce the change in turning angle of the rear wheels, which is caused along with turning of the vehicle body, and its resultant degradation in steering stability without causing a spring constant of an elastic member interposed between the vehicle body and the suspension member to be excessively high, that is, while securing a satisfactory performance of shutting down vibration from the rear wheels to the vehicle body.

DETAILED DESCRIPTION OF THE PREFERRED EMBODIMENTS

Now, a preferred embodiment of the present disclosure is described in detail with reference to the accompanying drawings.

First Embodiment

Figure 1:
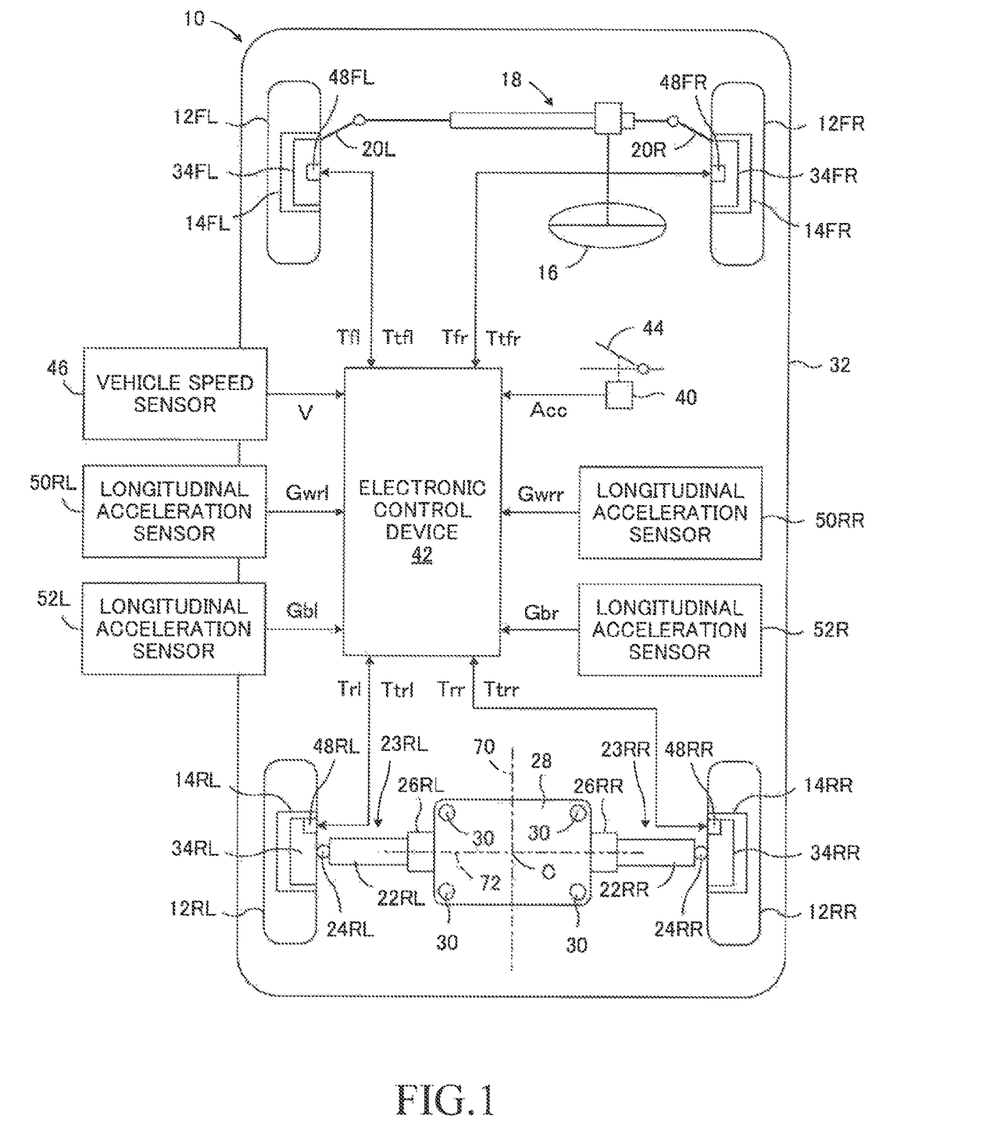
FIG. 1 is a schematic configuration diagram for illustrating an electric vehicle applied to a four-wheel drive vehicle having in-wheel motors according to a first embodiment of the present disclosure.

FIG. 1 is a schematic configuration diagram for illustrating an electric vehicle 10 applied to a four-wheel drive vehicle having in-wheel motors according to a first embodiment of the present disclosure. The electric vehicle 10 includes left and right front wheels 12FL and 12FR, which are steered wheels, and left and right rear wheels 12RL and 12RR, which are non-steered wheels. The wheels 12FL to 12RR are rotatably supported around rotational axes of respective wheels by wheel support members 14FL to 14RR, respectively. The left and right front wheels 12FL and 12FR are steered via tie rods 20L and 20R by a rack-and-pinion power steering device 18, which is driven in response to steering of a steering wheel 16 by a driver.

The rear wheels 12RL and 12RR are suspended by rear wheel suspensions 23RL and 23RR including suspension arms 22RL and 22RR, respectively. The suspension arms 22RL and 22RR are pivotally coupled to the wheel support members 14RL and 14RR at their outer ends by joints 24RL and 24RR, such as ball joints, and are pivotally coupled to a suspension member 28 at their inner ends by rubber bush devices 26RL and 26RR. The suspension member 28 is coupled to a vehicle body 32 of the vehicle 10 at four positions that are spaced apart in longitudinal and lateral directions by rubber bush devices 30 including rubber bushes, which are elastic members. The suspensions 23RL and 23RR may include a plurality of respective members although the number of suspension arms 22RL and 22RR and the like illustrated in FIG. 1 is one.

The rear wheel suspensions 23RL and 23RR allow for bounding or rebounding of the rear wheels 12RL and 12RR due to pivoting of the suspension arms 22RL and 22RR. Further, the rear wheel suspensions 23RL and 23RR elastically allow the rear wheels 12RL and 12RR to be displaced in a longitudinal or lateral direction of the vehicle with respect to the vehicle body 32 in cooperation with the suspension member 28. The front wheels 12FL and 12FR may also be suspended by a suspension mechanism similar to that of the rear wheels 12RL and 12RR.

The wheels 12FL to 12RR are drive wheels, and are driven by being applied with driving forces independently of one another by in-wheel motors 34FL to 34RR, which are incorporated into the respective corresponding wheel support members 14FL to 14RR. Although not shown in FIG. 1, the wheels 12FL to 12RR are braked by being applied with frictional braking by a braking apparatus. Although not shown in detail in FIG. 1, the in-wheel motors 34FL to 34RR are each a three-phase brushless AC motor capable of controlling a driving torque and a rotational speed. The in-wheel motors 34FL to 34RR may each function as a regenerative generator at the time of braking to generate a regenerative braking force.

When braking/driving forces in the same phase act on the rear wheels 12RL and 12RR, a longitudinal force acts on the suspension member 28, and thus the suspension member 28 is displaced in the longitudinal direction and the rear wheels 12RL and 12RR are also displaced in the longitudinal direction in the same phase with respect to the vehicle body 32. In contrast, when braking/driving forces in opposite phases act on the rear wheels 12RL and 12RR, a moment acts on the suspension member 28 around its perpendicular axis.

Thus, when a point C is defined as an intersection of a straight line 70 in the longitudinal direction passing through midpoints of pairs of left and right rubber bush apparatus 30 and a straight line 72 in the lateral direction of the vehicle passing through midpoints of pairs of front and back rubber bush apparatus 30, the suspension member 28 is in a yaw motion with respect to the vehicle body 32 substantially around the intersection C. Because of this, one of the rear wheels 12RL and 12RR is displaced in a forward direction of the vehicle with respect to the vehicle body 32, that is, displaced in a traveling forward direction of the vehicle, whereas the other of the rear wheels 12RL and 12RR is displaced in a backward direction of the vehicle with respect to the vehicle body 32, that is, displaced in a traveling backward direction of the vehicle.

When the electric vehicle 10 is traveling, driving forces of the in-wheel motors 34FL to 34RR are controlled by an electronic control device 42 based on an accelerator opening degree Acc detected by an accelerator opening degree sensor 40. The accelerator opening degree Acc indicates a depression amount of an accelerator pedal 44, namely, a driving operation amount of the driver. The regenerative braking forces of the in-wheel motors 34FL to 34RR are controlled via the electronic control device 42 by a braking electronic control device, which is not shown in FIG. 1.

Although not shown in detail in FIG. 1, the electronic control device 42 and the braking electronic control device each include a microcomputer and a drive circuit, and are configured to transmit or receive necessary information to/from one another. Each microcomputer generally includes a CPU, a ROM, a RAM, and an input and output port device, those components being connected to one another via a bilateral common bus.

A signal indicating the accelerator opening degree Acc is input to the electronic control device 42 from the accelerator opening degree sensor 40. In addition, a signal indicating a vehicle speed V is input to the electronic control device 42 from a vehicle speed sensor 46. Torque sensors 48FL to 48RR are built into the in-wheel motors 34FL to 34RR, respectively. Signals indicating driving torques Ti (i=fl, fr, rl, and rr) of the in-wheel motors 34FL to 34RR are input to the electronic control device 42 from the corresponding torque sensors 48FL to 48RR.

Longitudinal acceleration sensors 50RL and 50RR configured to detect longitudinal accelerations Gwrl and Gwrr of the rear wheels 12RL and 12RR are arranged in the wheel support members 14RL and 14RR, respectively. Longitudinal acceleration sensors 52L and 52R configured to detect longitudinal accelerations Gbl and Gbr of the vehicle body 32 at positions spaced apart in the lateral direction of the vehicle are arranged in the vehicle body 32 in correspondence to the rear wheels 12RL and 12RR, respectively. The longitudinal acceleration sensors 50RL and 50RR and the longitudinal acceleration sensors 52L and 52R are configured to detect longitudinal accelerations with corresponding acceleration directions of the vehicle being positive. Signals indicating the longitudinal accelerations Gwrl and Gwrr detected by the longitudinal acceleration sensors 50RL and 50RR and signals indicating the longitudinal accelerations Gbl and Gbr detected by the longitudinal acceleration sensors 52L and 52R are also input to the electronic control device 42.

Figure 2:
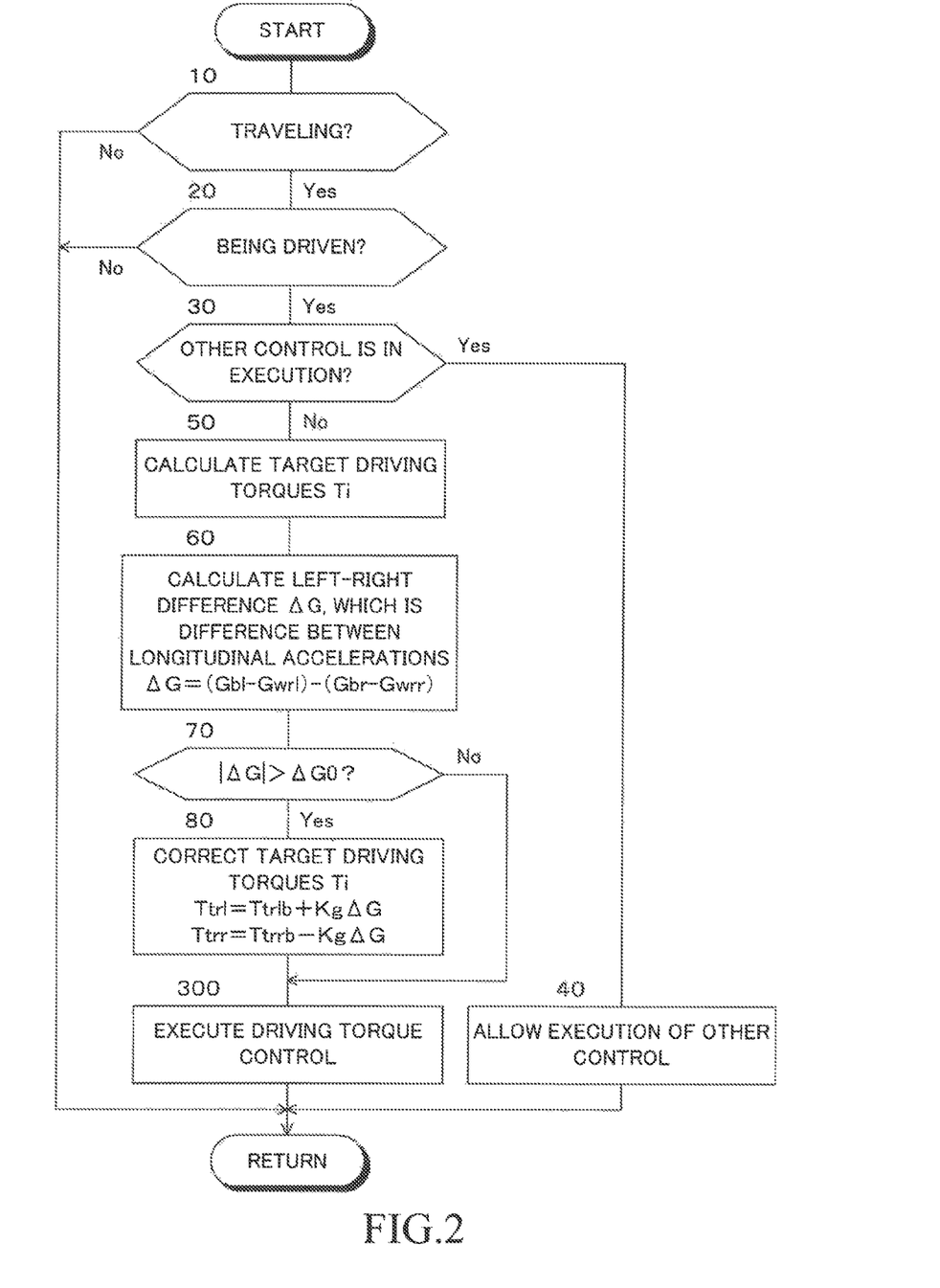
FIG. 2 is a flowchart for illustrating a control routine of braking/driving torques of wheels according to the first embodiment.

The electronic control device 42 is configured to calculate target driving torques Tti (i=fl, fr, rl, and rr) for respective wheels based on the accelerator opening degree Acc in accordance with a flowchart illustrated in FIG. 2, and feed-back control the in-wheel motors 34FL to 34RR so that an actual driving torque Ti attains the target driving torque Tti. The electronic control device 42 is configured to calculate a left-right difference ΔG, which is a difference between the longitudinal accelerations of the rear wheels 12RL and 12RR with respect to the vehicle body 32, based on the longitudinal accelerations Gwrl and Gwrr and the longitudinal accelerations Gbl and Gbr in accordance with Expression (1) as a value relevant to a difference between relative displacement amounts of the rear wheels 12RL and 12RR in the longitudinal direction of the vehicle.

$$\Delta G = (Gbl - Gwrl) - (Gbr - Gwrr) \quad (1)$$

In Expression (1), a longitudinal acceleration difference Gbl−Gwrl is a value relating to a relative displacement amount of the left rear wheel 12RL in the longitudinal direction with respect to the vehicle body 32, and a longitudinal acceleration difference Gbr−Gwrr is a value relating to a relative displacement amount of the right rear wheels 12RR in the longitudinal direction of the vehicle with respect to the vehicle body 32. Thus, the longitudinal acceleration sensors 50RL and 50RR and the longitudinal acceleration sensors 52L and 52R function as an acquisition apparatus configured to acquire the values relating to the relative displacement amounts of the left and right rear wheels 12RL and 12RR in the longitudinal direction with respect to the vehicle body 32 in cooperation with the electronic control device 42.

Further, the electronic control device 42 is configured to correct the target driving torques Tti for the rear wheels 12RL and 12RR so that the magnitude of the left-right difference ΔG, which is a difference between the longitudinal accelerations, becomes smaller when the magnitude of the left-right difference ΔG, which is a difference between the longitudinal accelerations, is larger than a reference value ΔG0 (positive constant).

Next, a description is given of control of the driving torques of the wheels in the first embodiment with reference to the flowchart illustrated in FIG. 2. Control in accordance with the flowchart illustrated in FIG. 2 is repeatedly executed at predetermined time periods when an ignition switch (not shown) is on. In the following description of the control in accordance with the flowchart illustrated in FIG. 2, the control in accordance with the flowchart illustrated in FIG. 2 is simply referred to as "control". Those matters also apply to control in accordance with flowcharts illustrated in FIG. 4 and FIG. 6 described later.

First, in Step 10, it is determined whether or not the electric vehicle 10 is traveling or not based on determination of, for example, whether or not the vehicle speed V is higher than a reference value (positive constant). When a negative determination is made, the control is temporarily stopped, whereas when an affirmative determination is made, the control proceeds to Step 20.

In Step 20, it is determined whether or not the electric vehicle 10 is being driven or not based on determination of, for example, whether or not the accelerator opening degree Acc is larger than a reference value (positive constant). When a negative determination is made, the control is temporarily stopped, whereas when an affirmative determination is made, the control proceeds to Step 30.

In Step 30, it is determined whether or not other control is in execution, which controls the braking/driving force of the wheel in order to improve the travel performance of the vehicle like traction control. When an affirmative determination is made, the execution of this other control is allowed in Step 40, whereas when a negative determination is made, the control proceeds to Step 50.

In Step 50, the target driving torque Tti of each wheel is calculated based on the accelerator opening degree Acc and a ratio of distributing the driving force to the front and rear wheels. For example, it is assumed that the target driving torque of the entire vehicle that is based on the accelerator opening degree Acc is Ttall, and the ratio of distributing the driving force to the front wheels is Rf (value larger than 0 and smaller than 1). Both of target driving torques of left and right front wheels Ttfl and Ttfr are calculated to be TtallRf/2, and both of target driving torques of left and right rear wheels Ttrl and Ttrr are calculated to be Ttall(1−Rf)/2.

In Step 60, the left-right difference ΔG, which is a difference between the longitudinal accelerations, is calculated in accordance with Expression (1) as a difference between a value corresponding to a relative displacement amount of the left rear wheel 12RL in the longitudinal direction with respect to the vehicle body 32 and a value corresponding to a relative displacement amount of the right rear wheel 12RR in the longitudinal direction with respect to the vehicle body 32.

In Step 70, it is determined whether or not the absolute value of the left-right difference ΔG, which is a difference between the longitudinal accelerations, is larger than the reference value ΔG0, that is, whether or not the target driving torques Ttrl and Ttrr for the rear wheels 12RL and 12RR need to be corrected. When a negative determination is made, the control proceeds to Step 300, whereas when an affirmative determination is made, the control proceeds to Step 80.

In Step 80, the target driving torques Ttrl and Ttrr are corrected in accordance with Expressions (2) and (3), where Ttrlb and Ttrrb are the target driving torques for the rear wheels 12RL and 12RR calculated in Step 50, respectively, and Kg is a coefficient set in advance (positive constant).

$$Ttrl = Ttrlb + Kg\Delta G \tag{2}$$

$$Ttrr = Ttrrb - Kg\Delta G \tag{3}$$

In Step 300, the driving torques Ti of respective wheels are detected by the torque sensors 48FL to 48RR, and outputs of the in-wheel motors 34FL to 34RR are feed-back controlled so that the driving torques Ti of respective wheels attain the target driving torques Tti, respectively.

As can be understood from the above description, when the electric vehicle 10 is driven and traveling (Steps 10 and 20) and other control is not in execution (Step 30), Steps 50 to 300 are executed. That is, in Step 50, the target driving torques Tti for respective wheels are calculated based on the accelerator opening degree Acc and the driving force distribution ratio for the front and rear wheels, and in Step 60, the left-right difference ΔG, which is a difference between the longitudinal accelerations, is calculated.

When the absolute value of the left-right difference ΔG, which is a difference between the longitudinal accelerations, is larger than the reference value ΔG0, an affirmative determination is made in Step 70, and the target driving torques Ttrl and Ttrr are corrected in accordance with Expressions (2) and (3) in Step 80. Further, in Step 300, the outputs of the in-wheel motors 34FL to 34RR are feed-back controlled so that the driving torques Ti for respective wheels attain the target driving torques Tti, respectively. Because of this, one rear wheel on a traveling backward direction side of the vehicle with respect to the vehicle body 32 moves toward a traveling forward direction side of the vehicle with respect to the vehicle body 32, whereas the other rear wheel on the traveling forward direction side of the vehicle with respect to the vehicle body 32 moves toward the traveling backward direction side of the vehicle with respect to the vehicle body 32.

Figure 7A:
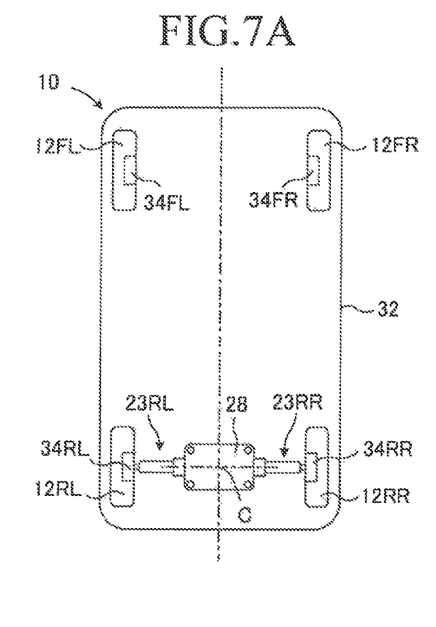
FIG. 7A to FIG. 7C are explanatory diagrams for illustrating displacements in a yaw direction of rear wheels with respect to a vehicle body at a time of transitional turning of the vehicle.
Figure 7B:
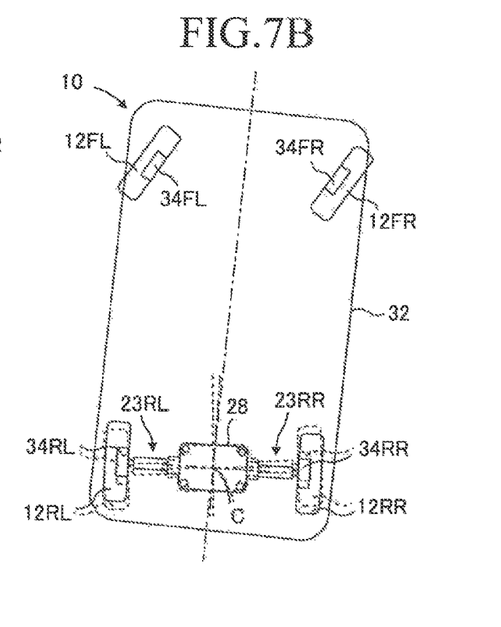
Figure 7C:
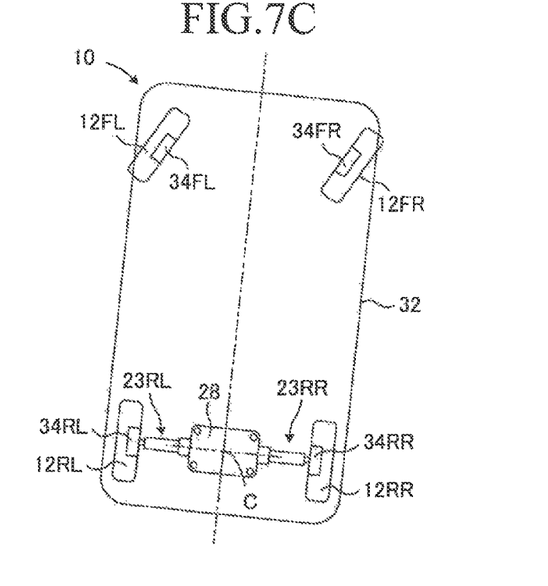

FIG. 7A to FIG. 7C are illustrations of changes in position of the rear wheels 12RL and 12RR with respect to the vehicle body 32 when the electric vehicle 10 changes from a traveling straight ahead state to a turning state, which represent the traveling straight ahead state, a transitional turning state, and a regular turning state, respectively. In FIG. 7B, the solid line and the broken line indicate changes in position of the rear wheels 12RL and 12RR in a case of the first embodiment and a case of a related-art vehicle that does not perform control in accordance with the present disclosure, respectively.

In the case of the related-art vehicle, even when the electric vehicle 10 transitions from the traveling straight ahead state to the turning state and the vehicle body 32 turns around, the rear wheels 12RL and 12RR try to maintain their earlier movement states. Thus, as indicated by the broken line in FIG. 7B, the suspension member 28 is in a yaw motion substantially around the intersection C in a direction opposite to the turning direction with respect to the vehicle body 32 in accordance with a compliance caused by elastic deformation of the rubber bush devices 26RL, 26RR, and 30 or the like of a rear wheel suspension. As a result, the rear wheels 12RL and 12RR are in the state of temporarily being steered in a direction opposite to that of the front wheels.

When the electric vehicle 10 transitions to the regular turning state illustrated in FIG. 7C, the suspension member 28 is caused to be in a yaw motion substantially around the intersection C in the turning direction with respect to the vehicle body 32 due to a restoring moment caused by a force generated by elastic deformation of the rubber bush or the like. As a result, the rear wheels 12RL and 12RR are in a yaw motion in the turning direction with respect to the vehicle body 32 so that a longitudinal direction of the rear wheels 12RL and 12RR is directed along a longitudinal direction of the vehicle 10.

A change in turning angle of the rear wheels 12RL and 12RR due to the above-mentioned yaw motion at the time of transitional turning of the electric vehicle 10 becomes more conspicuous as the compliance of the suspension increases. Thus, in the related-art vehicle, when the compliance of the suspension is set high in order to ensure a satisfactory ride quality, degradation in steering stability due to the change in turning angle of the rear wheels at the time of transitional turning cannot be avoided.

In contrast, in the first embodiment, the target driving torques Ttrl and Ttrr are corrected at the time of transitional turning, and thus the rear wheel 12RL on the traveling backward direction side of the vehicle with respect to the vehicle body 32 moves toward the traveling forward direction side of the vehicle with respect to the vehicle body 32, whereas the rear wheel 12RR on the traveling forward direction side of the vehicle with respect to the vehicle body 32 moves toward the traveling backward direction side of the vehicle with respect to the vehicle body 32. Thus, as indicated by the solid line in FIG. 7B, the amounts of yaw motions of the suspension member 28 and the rear wheels 12RL and 12RR with respect to the vehicle body 32 can be reduced.

When the electric vehicle 10 transitions from the regular turning state to the traveling straight ahead state, the suspension member 28 is in a yaw motion substantially around the intersection C in the turning direction with respect to the vehicle body 32, that is, in a direction opposite to the direction of transitioning to the traveling straight ahead state. Also in this case, the target driving torques Ttrl and Ttrr are corrected, and thus the rear wheel 12RL on the traveling backward direction side of the vehicle with respect to the vehicle body 32 moves toward the traveling forward direction side of the vehicle with respect to the vehicle body 32, whereas the rear wheel 12RR on the traveling forward direction side of the vehicle with respect to the vehicle body 32 moves toward the traveling backward direction side of the vehicle with respect to the vehicle body 32. Thus, the amounts of yaw motions of the suspension member 28 and the rear wheels 12RL and 12RR with respect to the vehicle body 32 can be reduced.

Thus, in the first embodiment, even when the compliance of the suspension is set high in order to ensure a satisfactory ride quality of the vehicle, it is possible to reduce degradation in steering stability due to the change in turning angle of the rear wheels at the time of transitional turning irrespective of the manner of transitioning between the traveling straight ahead state and the turning state.

In particular, in the first embodiment, the left-right difference ΔG, which is a difference between the longitudinal accelerations of the rear wheels 12RL and 12RR with respect to the vehicle body 32, is calculated as a value relevant to a difference between the relative displacement amounts of the rear wheels 12RL and 12RR in the longitudinal direction of the vehicle. The left-right difference ΔG, which is a difference between the longitudinal accelerations, is a change acceleration of the difference between the relative displacement amounts of the rear wheels 12RL and 12RR in the longitudinal direction of the vehicle, and the change acceleration of the difference between the relative displacement amounts leads the difference between the relative displacement amounts and a change velocity of the difference between the relative displacement amounts in terms of phase. Thus, in the first embodiment, as compared to cases of second and third embodiments of the present disclosure described later, where the change velocity of the difference between the relative displacement amounts is acquired, it is possible to effectively reduce a concern of delay of reducing the change in turning angle of the rear wheels, to thereby be able to effectively reduce degradation in steering stability due to the change in turning angle of the rear wheels.

In the first embodiment, the longitudinal accelerations Gbl and Gbr of the vehicle body 32 at positions that are spaced apart in the lateral direction of the vehicle in correspondence to the rear wheels 12RL and 12RR, respectively, are detected by the longitudinal acceleration sensors 52L and 52R. However, the longitudinal accelerations Gbl and Gbr may be estimated based on the longitudinal acceleration Gb at the center of mass of the vehicle 10, a yaw rate Yrb around the center of mass of the vehicle 10, and a tread of the vehicle 10.

Second Embodiment

Figure 3:
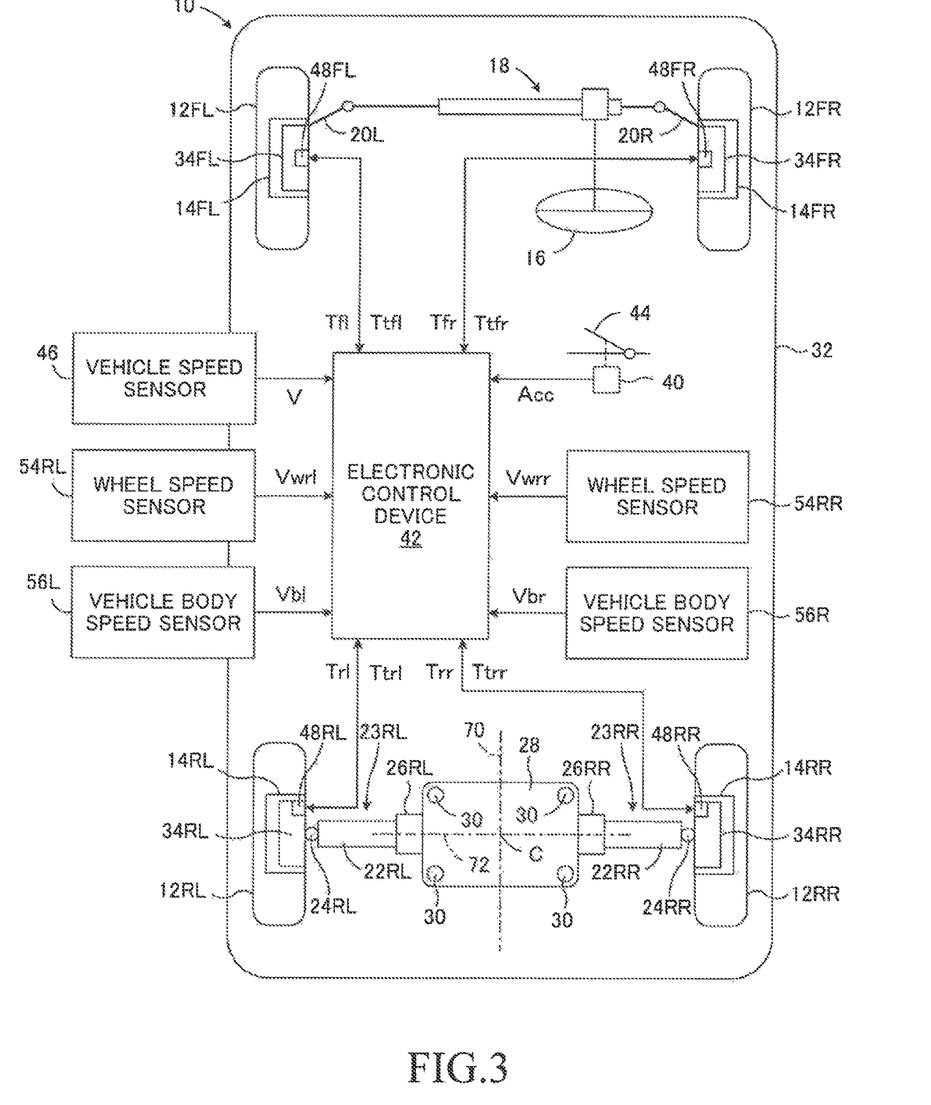
FIG. 3 is a schematic configuration diagram for illustrating an electric vehicle applied to a four-wheel drive vehicle having in-wheel motors according to a second embodiment of the present disclosure.

FIG. 3 is a schematic configuration diagram for illustrating the electric vehicle 10 applied to a four-wheel drive vehicle having in-wheel motors according to the second embodiment of the present disclosure. In FIG. 3, the same components as those illustrated in FIG. 1 are denoted by the same reference symbols as those illustrated in FIG. 1. This also applies to FIG. 5 described later.

In the second embodiment, wheel speed sensors 54RL and 54RR configured to detect rotational speeds of corresponding wheels, namely, wheel speeds Vwrl and Vwrr are arranged in the left and right rear wheels 12RL and 12RR. The wheel speed sensors 54RL and 54RR are configured to detect the wheel speeds Vwrl and Vwrr with the wheel speed of when the vehicle travels straight ahead being positive. Vehicle body speed sensors 56L and 56R configured to detect vehicle body speeds Vbl and Vbr of the vehicle body 32 at positions that are spaced apart in the lateral direction of the vehicle in correspondence to the rear wheels 12RL and 12RR are arranged in the vehicle body 32. The vehicle body speed sensors 56L and 56R are configured to detect the vehicle body speeds Vbl and Vbr with the wheel speed of when the vehicle travels straight ahead being positive. Signals indicating the wheel speeds Vwrl and Vwrr detected by the wheel speed sensors 54RL and 54RR and signals indicating the vehicle body speeds Vbl and Vbr detected by the vehicle body speed sensors 56L and 56R are input to the electronic control device 42.

The vehicle body speed sensors 56L and 56R may be configured to detect the vehicle body speeds Vbl and Vbr by, for example, detecting a vehicle ground speed optically. In other cases, the vehicle body speed sensors 56L and 56R may be configured to output integral values of the longitudinal accelerations Gbrl and Gbrr detected by the longitudinal acceleration sensors 52L and 52R in the first embodiment as the vehicle body speeds Vbl and Vbr.

Figure 4:
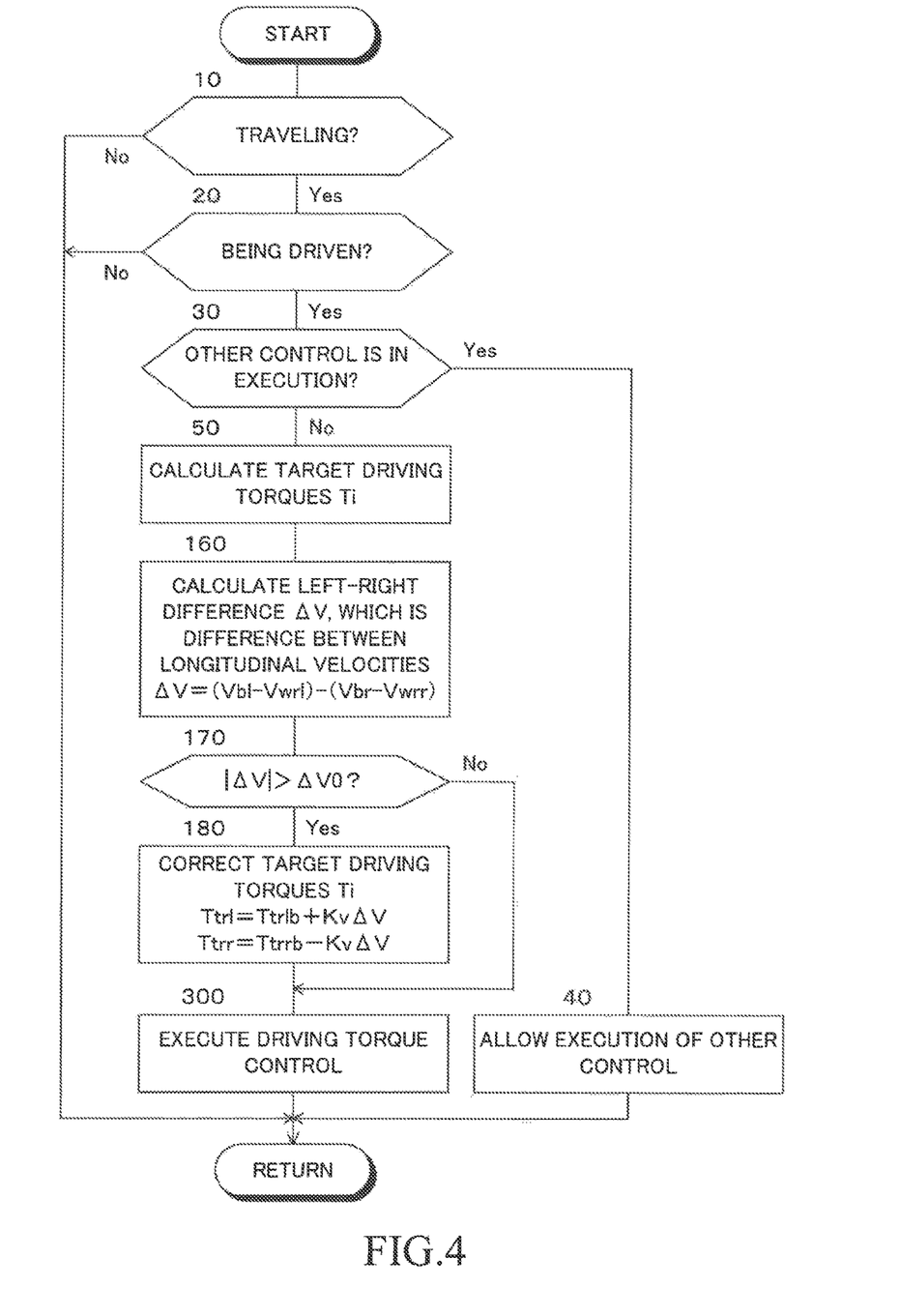
FIG. 4 is a flowchart for illustrating a control routine of braking/driving torques of wheels according to the second embodiment.

The electronic control device 42 is configured to calculate the target driving torques Tti for respective wheels based on the accelerator opening degree Acc in accordance with a flowchart illustrated in FIG. 4, and feed-back control the in-wheel motors 34FL to 34RR so that the actual driving torque Ti attains the target driving torque Tti. The electronic control device 42 is configured to calculate a left-right difference ΔV, which is a difference between the longitudinal velocities of the rear wheels 12RL and 12RR with respect to the vehicle body 32, based on the wheels speeds Vwrl and Vwrr and the vehicle body speeds Vbl and Vbr in accordance with Expression (4) as a value relevant to a difference between the relative displacement amounts of the rear wheels 12RL and 12RR in the longitudinal direction of the vehicle.

$$\Delta V = (Vbl - Vwrl) - (Vbr - Vwrr) \quad (4)$$

In Expression (4), the difference between the longitudinal velocities Vbl−Vwrl is a value relevant to a relative displacement amount of the left rear wheel 12RL in the longitudinal direction with respect to the vehicle body 32, and the longitudinal velocities Vbr−Vwrr is a value relevant to a relative displacement amount of the right rear wheel 12RR in the longitudinal direction of the vehicle with respect to the vehicle body 32. Thus, the wheel speed sensors 54RL and 54RR, and the vehicle body speed sensors 56L and 56R function as the acquisition apparatus configured to acquire the value relevant to the relative displacement amount of the left and right rear wheels 12RL and 12RR in the longitudinal direction with respect to the vehicle body 32 in cooperation with the electronic control device 42.

Further, the electronic control device 42 is configured to, when the magnitude of the left-right difference ΔV, which is a difference between the longitudinal velocities, is larger than a reference value ΔV0 (positive constant), correct the target driving torques Tti for the rear wheels 12RL and 12RR so that the magnitude of the difference ΔV between the longitudinal velocities becomes smaller.

Next, a description is given of control of driving torques of the wheels in the second embodiment with reference to the flowchart illustrated in FIG. 4. In FIG. 4, the same steps as those illustrated in FIG. 2 are denoted by the same step numbers as those illustrated in FIG. 2. This also applies to FIG. 6 described later.

In the second embodiment, Steps 10 to 50 and Step 300 are executed similarly to Steps 10 to 50 and Step 300 in the first embodiment, respectively, and when Step 50 is completed, the control proceeds to Step 160.

In Step 160, the left-right difference ΔV, which is a difference between the longitudinal velocities, is calculated in accordance with Expression (4) as a difference between a value relevant to a relative displacement amount of the left rear wheel 12RL in the longitudinal direction with respect to the vehicle body 32 and a value relevant to a relative displacement amount of the right rear wheel 12RR in the longitudinal direction with respect to the vehicle body 32.

In Step 170, it is determined whether or not the absolute value of the left-right difference ΔV, which is a difference between the longitudinal velocities, is larger than the reference value $\Delta V0$, that is, whether or not the target driving torques Ttrl and Ttrr for the rear wheels 12RL and 12RR need to be corrected. When a negative determination is made, the control proceeds to Step 300, whereas when an affirmative determination is made, the control proceeds to Step 180.

In Step 180, the target driving torques Ttrl and Ttrr are corrected in accordance with Expressions (5) and (6), where Ttrlb and Ttrrb are the target driving torques for the rear wheels 12RL and 12RR calculated in Step 50, respectively, and Kv is a coefficient set in advance (positive constant).

$$Ttrl = Ttrlb + Kv\Delta V \quad (5)$$

$$Ttrr = Ttrrb - Kv\Delta V \quad (6)$$

In the second embodiment, in Step 160, the left-right difference $\Delta V$, which is a difference between the longitudinal velocities, is calculated as a difference between the relative velocity (Vbl−Vwrl) of the left rear wheel 12RL in the longitudinal direction with respect to the vehicle body 32 and the relative velocity (Vbr−Vwrr) of the right rear wheel 12RR in the longitudinal direction with respect to the vehicle body 32. Further, through correction of the target driving torques Ttrl and Ttrr at the time of transitional turning based on the left-right difference $\Delta V$, which is a difference between the longitudinal velocities, one rear wheel on a traveling backward direction side of the vehicle with respect to the vehicle body 32 moves toward a traveling forward direction side of the vehicle with respect to the vehicle body 32, whereas the other rear wheel on the traveling forward direction side of the vehicle with respect to the vehicle body 32 moves toward the traveling backward direction side of the vehicle with respect to the vehicle body 32.

Thus, in the same way as in the first embodiment, it is possible to reduce the amounts of the yaw motions of the suspension member 28 and the rear wheels 12RL and 12RR with respect to the vehicle body 32. Thus, even when the compliance of the suspension is set high in order to ensure a satisfactory ride quality of the vehicle, it is possible to reduce degradation in steering stability due to the change in turning angle of the rear wheels at the time of transitional turning.

In particular, in the second embodiment, the left-right difference $\Delta V$, which is a difference between the longitudinal velocities of the rear wheels 12RL and 12RR with respect to the vehicle body 32, is calculated as a value relevant to a difference between the relative displacement amounts of the rear wheels 12RL and 12RR in the longitudinal direction of the vehicle. The left-right difference $\Delta G$, which is a difference between the longitudinal velocities, is a change velocity of the difference between the relative displacement amounts of the rear wheels 12RL and 12RR in the longitudinal direction of the vehicle, and the change velocity of the difference between the relative displacement amounts leads the difference between the relative displacement amounts in terms of phase. Thus, as compared to the case in which the target driving torques Ttrl and Ttrr are corrected based on the difference between the relative displacement amounts of the left and right rear wheels in the longitudinal direction of the vehicle with respect to the vehicle body 32, it is possible to effectively reduce a concern of delay of reducing the change in turning angle of the rear wheels, to thereby be able to effectively reduce degradation in steering stability due to the change in turning angle of the rear wheels.

In the second embodiment, the vehicle body speeds Vbl and Vbr of the vehicle body 32 at positions that are spaced apart in the lateral direction of the vehicle in correspondence to the rear wheels 12RL and 12RR, respectively, are detected by the vehicle body speed sensors 56L and 56R. However, the vehicle body speeds Vbl and Vbr may be estimated based on a longitudinal velocity Vb at the center of mass of the vehicle 10, the yaw rate Yrb around the center of mass of the vehicle 10, and the tread of the vehicle 10.

Third Embodiment

Figure 5:
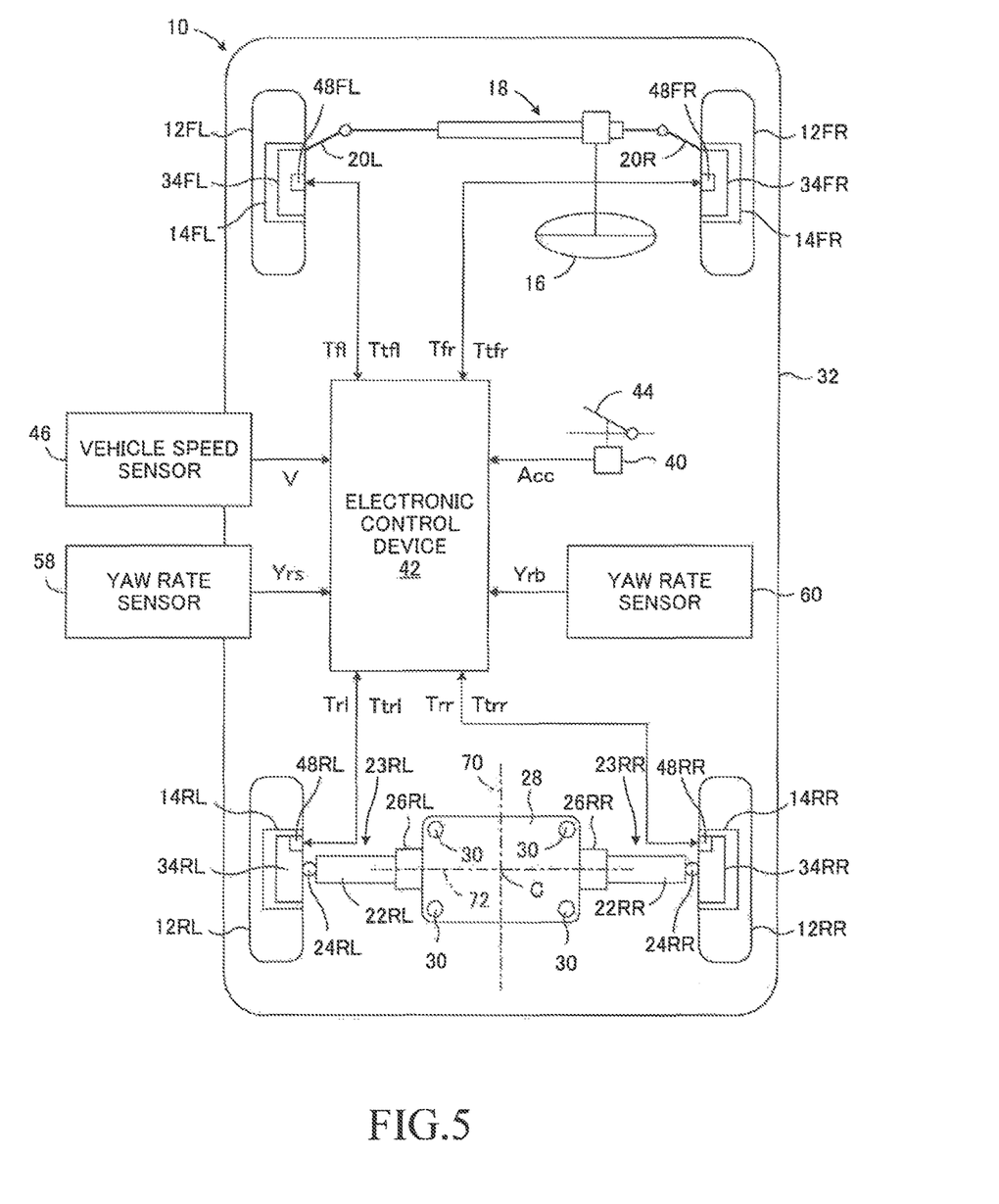
FIG. 5 is a schematic configuration diagram for illustrating an electric vehicle applied to a four-wheel drive vehicle having in-wheel motors according to a third embodiment of the present disclosure.

FIG. 5 is a schematic configuration diagram for illustrating the electric vehicle 10 applied to a four-wheel drive vehicle having in-wheel motors according to the third embodiment of the present disclosure.

In the third embodiment, a yaw rate sensor 58 configured to detect a yaw rate Yrs of the suspension member 28 around the intersection C is arranged in the suspension member 28. A yaw rate sensor 60 configured to detect the yaw rate Yrb of the vehicle body 32 around the intersection C is arranged in the vehicle body 32. The yaw rate sensors 58 and 60 are configured to detect the yaw rates Yrs and Yrb, respectively, with the yaw rate in the clockwise direction being positive. Signals indicating the yaw rates Yrs and Yrb detected by the yaw rate sensors 58 and 60, respectively, are input to the electronic control device 42.

Figure 6:
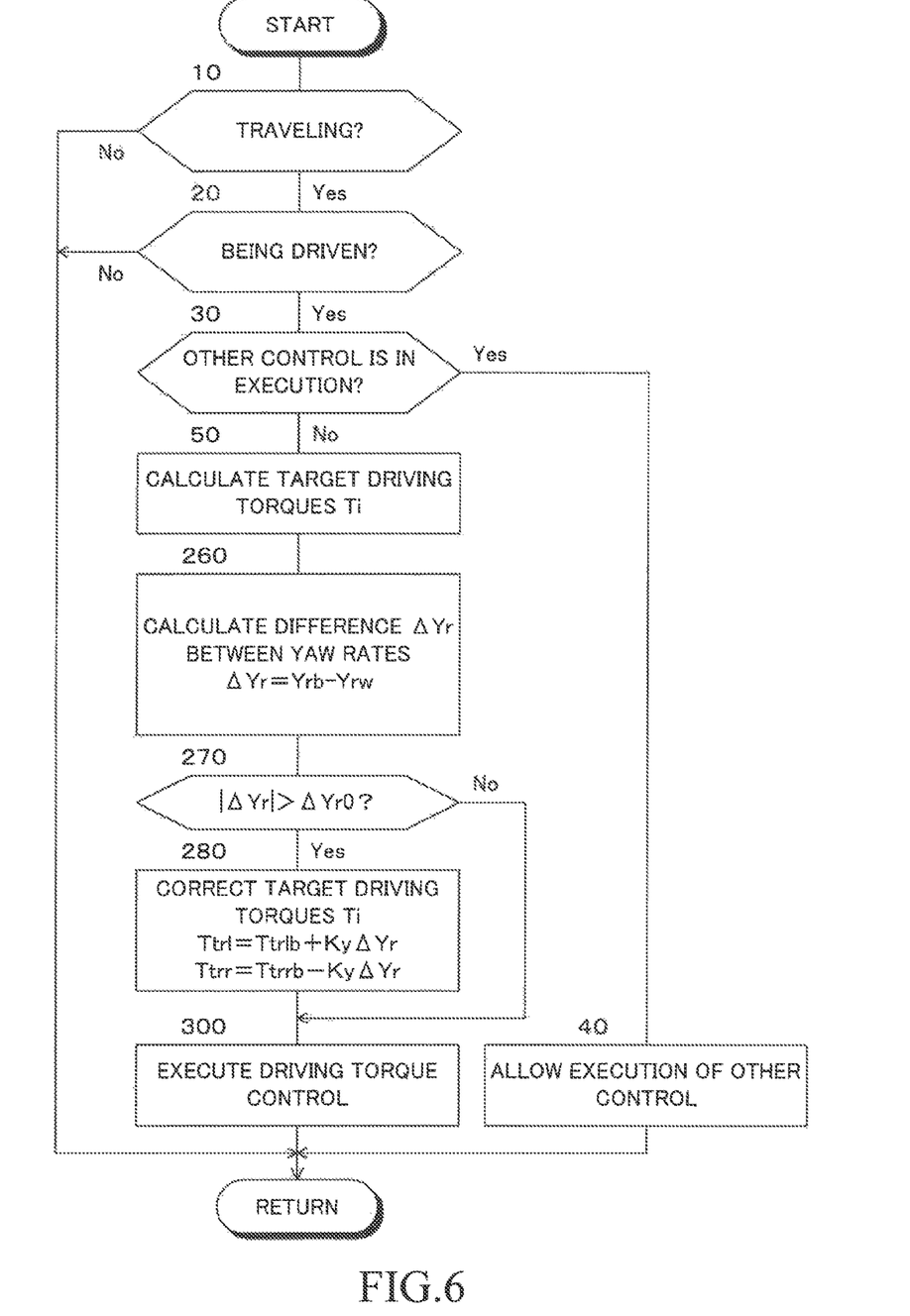
FIG. 6 is a flowchart for illustrating a control routine of braking/driving torques of wheels according to the third embodiment.

The electronic control device 42 is configured to calculate the target driving torques Tti for respective wheels based on the accelerator opening degree Acc in accordance with a flowchart illustrated in FIG. 6, and feed-back control the in-wheel motors 34FL to 34RR so that the actual driving torque Ti attains the target driving torque Tti. The electronic control device 42 is configured to calculate, based on the yaw rates Yrs and Yrb, a difference $\Delta Yr(=Yrs-Yrb)$ between the yaw rate Yrs and the yaw rate Yrb, namely, a yaw rate of the suspension member 28 with respect to the vehicle body 32, as a value relevant to a difference between the relative displacement amounts of the rear wheels 12RL and 12RR in the longitudinal direction of the vehicle with respect to the vehicle body 32. Thus, the yaw rate sensors 58 and 60 function as the acquisition apparatus configured to acquire the value relevant to the relative displacement amount of the left and right rear wheels 12RL and 12RR in the longitudinal direction with respect to the vehicle body 32 in cooperation with the electronic control device 42.

Further, the electronic control device 42 is configured to, when the magnitude of the difference $\Delta Yr$ between the yaw rates is larger than a reference value $\Delta Yr0$ (positive constant), correct the target driving torques Tti for the rear wheels 12RL and 12RR so that the magnitude of the difference $\Delta Yr$ between the yaw rates becomes smaller.

Next, a description is given of control of driving torques of the wheels in the third embodiment with reference to the flowchart illustrated in FIG. 6.

In the third embodiment, Steps 10 to 50 and Step 300 are executed similarly to Steps 10 to 50 and Step 300 in the first embodiment, respectively. When Step 50 is completed, the control proceeds to Step 260.

In Step 260, the difference $\Delta Yr$ between the yaw rate Yrs of the suspension member 28 and the yaw rate Yrb of the vehicle body 32 is calculated as a value relevant to a difference between the relative displacement amounts of the rear wheels 12RL and 12RR with respect to the vehicle body 32.

In Step 270, it is determined whether or not the absolute value of the difference $\Delta Yr$ between the yaw rates is larger than the reference value $\Delta Yr0$, that is, whether or not the target driving torques Ttrl and Ttrr for the rear wheels 12RL and 12RR need to be corrected. When a negative determination is made, the control proceeds to Step 300, whereas when an affirmative determination is made, the control proceeds to Step 280.

In Step 280, the target driving torques Ttrl and Ttrr are corrected in accordance with Expressions (7) and (8), where Ttrlb and Ttrrb are the target driving torques for the rear wheels 12RL and 12RR calculated in Step 50, respectively, and Kv is a coefficient set in advance (positive constant).

$$Ttrl=Ttrlb+Ky\Delta Yr \qquad (7)$$

$$Ttrr=Ttrrb-Ky\Delta Yr \qquad (8)$$

In the third embodiment, in Step 260, the difference $\Delta Yr$ between the yaw rate Yrs of the suspension member 28 and the yaw rate Yrb of the vehicle body 32 is calculated. Further, through correction of the target driving torques Ttrl and Ttrr at the time of transitional turning based on the difference $\Delta Yr$ between the yaw rates, the rear wheel 12RL on a traveling backward direction side of the vehicle with respect to the vehicle body 32 moves toward a traveling forward direction side of the vehicle with respect to the vehicle body 32, whereas the rear wheel 12RR on the traveling forward direction side of the vehicle with respect to the vehicle body 32 moves toward the traveling backward direction side of the vehicle with respect to the vehicle body 32.

Thus, similarly to the first and second embodiments, it is possible to reduce the amounts of the yaw motions of the suspension member 28 and the rear wheels 12RL and 12RR with respect to the vehicle body 32. Thus, even when the compliance of the suspension is set high in order to ensure a satisfactory ride quality of the vehicle, it is possible to reduce degradation in steering stability due to the change in turning angle of the rear wheels at the time of transitional turning.

In particular, in the third embodiment, the difference $\Delta Yr$ between the yaw rate Yrs of the suspension member 28 and the yaw rate Yrb of the vehicle body 32 is calculated as a value relevant to a difference between the relative displacement amounts of the rear wheels 12RL and 12RR in the longitudinal direction of the vehicle. The difference $\Delta Yr$ between the yaw rates is a value corresponding to a change velocity of the difference between the relative displacement amounts of the rear wheels 12RL and 12RR in the longitudinal direction of the vehicle, and the change velocity of the difference between the relative displacement amounts leads the difference between the relative displacement amounts in terms of phase. Thus, similarly to the second embodiment, as compared to the case in which the target driving torques Ttrl and Ttrr are corrected based on the difference between the relative displacement amounts of the left and right rear wheels in the longitudinal direction of the vehicle with respect to the vehicle body 32, it is possible to effectively reduce a concern of delay of reducing the change in turning angle of the rear wheels, to thereby be able to effectively reduce degradation in steering stability due to the change in turning angle of the rear wheels.

In the third embodiment, the yaw rate Yrb of the vehicle body 32 around the intersection C is detected by the yaw rate sensor 60. However, the yaw rate Yrb of the vehicle body 32 may be estimated based on the yaw rate Yr of the center of mass of the vehicle body 10 and a distance between the center of mass of the vehicle 10 and an axle of the rear wheels in the longitudinal direction of the vehicle.

Further, in the first to third embodiments, it is not determined whether or not the vehicle is turning, and when affirmative determinations are made in Steps 70, 170, and 270, the target driving torques Ttrl and Ttrr are corrected in Step 80, 180, and 280. Thus, for example, even under a situation in which the vehicle receives a cross wind after passing through a tunnel, and the vehicle body is inclined, it is possible to effectively reduce degradation in steering stability due to the change in turning angle of the rear wheels 12RL and 12RR, which is caused along with turning of the vehicle body 32.

The specific embodiments of the present disclosure are described in detail above. However, the present disclosure is not limited to the embodiments described above. It is apparent for those skilled in the art that various other embodiments may be employed within the scope of the present disclosure.

For example, in the respective embodiments, the electric vehicle 10 includes the suspension member 28, and the suspension arms 22RL and 22RR are pivotally coupled to the suspension member 28 at their inner ends by the rubber bush devices 26RL and 26RR. However, the first and second embodiments may be applied to a vehicle that does not include a suspension member and has suspension arms of the rear wheels whose inner ends are pivotally coupled to the vehicle body 32 by the rubber bush devices 26RL and 26RR.

Further, in the respective embodiments, the value relevant to the difference between the relative displacement amounts of the left and right rear wheels in the longitudinal direction of the vehicle is the left-right difference $\Delta G$, which is a difference between the longitudinal accelerations of the rear wheels with respect to the vehicle body 32, the left-right difference $\Delta V$, which is a difference between the longitudinal velocities, or the difference $\Delta Yr$ between the yaw rate of the suspension member 28 and the yaw rate of the vehicle body 32. However, a rotational displacement amount $\Delta\theta$ of the suspension member 28 around the intersection C with respect to the vehicle body 32 may be detected by a rotational displacement amount sensor as a value relevant to the difference between the relative displacement amounts of the left and right wheels in the longitudinal direction of the vehicle. Further, in that case, the target driving torques Ttrl and Ttrr may be corrected in accordance with Expressions (9) and (10) with a coefficient set in advance being Ks (positive constant).

$$Ttrl=Ttrlb+Ks\Delta\theta \qquad (9)$$

$$Ttrr=Ttrrb-Ks\Delta\theta \qquad (10)$$

Further, in the respective embodiments, the in-wheel motors 34FL to 34RR are configured to apply driving forces to the corresponding wheels 12FL to 12RR independently of one another. However, the present disclosure may be applied to a vehicle whose two front wheels are coupled driving wheels or drive wheels driven by other driving means.

Further, in the respective embodiments, driving motors configured to apply driving forces to the wheels 12FL to 12RR are the in-wheel motors 34FL to 34RR, but the driving motors may be mounted on the suspension arms, or may be onboard motors mounted on the vehicle body.

What is claimed is:

1. An electric vehicle, comprising:
left and right rear wheels, which are suspended from a vehicle body by suspensions that elastically allow the left and right rear wheels to be displaced in a longitudinal direction of the electric vehicle with respect to the vehicle body, the left and right rear wheels being capable of being driven by corresponding motors independently of each other;
a control device configured to calculate target driving forces for the left and right rear wheels and to control driving forces of the left and right rear wheels based on the target driving forces; and
an acquisition device configured to acquire, when the electric vehicle is traveling, a value relevant to a difference between relative displacement amounts of the left and right rear wheels in the longitudinal direction of the electric vehicle with respect to the vehicle body,
wherein the control device is configured to correct the target driving forces for the left and right rear wheels based on the value relevant to the difference between the relative displacement amounts so as to reduce a magnitude of the value relevant to the difference between the relative displacement amounts.

2. The electric vehicle according to claim 1, wherein the acquisition device comprises:
   a device configured to detect longitudinal accelerations of the vehicle body at positions that are spaced apart in a lateral direction of the electric vehicle in correspondence to the left and right rear wheels; and
   a device configured to detect longitudinal accelerations of the left and right rear wheels, and
wherein the control device is configured to calculate, as the value relevant to the difference between the relative displacement amounts, a difference between a left-side longitudinal acceleration difference and a right-side longitudinal acceleration difference based on the left-side longitudinal acceleration difference, which is a difference between the longitudinal acceleration of the vehicle body corresponding to the left rear wheel and the longitudinal acceleration of the left rear wheel, and on the right-side longitudinal acceleration difference, which is a difference between the longitudinal acceleration of the vehicle body corresponding to the right rear wheel and the longitudinal acceleration of the right rear wheel.

3. The electric vehicle according to claim 1, wherein the acquisition device comprises:
   a device configured to detect longitudinal velocities of the vehicle body at positions that are spaced apart in a lateral direction of the electric vehicle in correspondence to the left and right rear wheels; and
   a device configured to detect longitudinal velocities of the left and right rear wheels, and
wherein the control device is configured to calculate, as the value relevant to the difference between the relative displacement amounts, a difference between a left-side longitudinal velocity difference and a right-side longitudinal velocity difference based on the left-side longitudinal velocity difference, which is a difference between the longitudinal velocity of the vehicle body corresponding to the left rear wheel and the longitudinal velocity of the left rear wheel, and on the right-side longitudinal velocity difference, which is a difference between the longitudinal velocity of the vehicle body corresponding to the right rear wheel and the longitudinal velocity of the right rear wheel.

4. The electric vehicle according to claim 1,
wherein the suspensions comprise:
   a suspension member, which is connected to the vehicle body via an elastic member; and
   left and right suspension arms configured to couple the left and right rear wheels to the suspension member,
wherein the acquisition device comprises a device configured to detect a yaw rate of the suspension member with respect to the vehicle body, and
wherein the control device is configured to determine the yaw rate of the suspension member with respect to the vehicle body as the value relevant to the difference between the relative displacement amounts.

5. The electric vehicle according to claim 2, wherein the suspensions comprise:
   a suspension member, which is connected to the vehicle body via an elastic member; and
   left and right suspension arms configured to couple the left and right rear wheels to the suspension member.

* * * * *